United States Patent [19]

Sakai et al.

[11] Patent Number: 4,908,572
[45] Date of Patent: Mar. 13, 1990

[54] ROTATIONAL SPEED SENSOR WITH UNFIXED AND/OR FIXED EDGE SPEED CALCULATION MODES

[75] Inventors: Kazunori Sakai, Aichi; Shinji Wakabayashi; Hiromi Maehata, both of Kariya, all of Japan

[73] Assignees: Toyota Jidosha Kabushiki Kaisha; Nippondenso Co., Ltd., both of Aichi, Japan

[21] Appl. No.: 220,625

[22] Filed: Jul. 18, 1988

[30] Foreign Application Priority Data

Jul. 22, 1987 [JP] Japan ............................. 62-182470
Jun. 17, 1988 [JP] Japan ............................. 63-150433

[51] Int. Cl.⁴ ............................................... G01P 3/48
[52] U.S. Cl. .................................................. 324/173
[58] Field of Search ............................. 324/173–175, 324/160, 178, 179, 163, 164, 165, 166, 167, 207, 208; 310/168, 155

[56] References Cited

U.S. PATENT DOCUMENTS

| 3,930,201 | 12/1975 | Ackerman et al. | 324/173 X |
| 4,227,150 | 10/1980 | Widl | 324/173 X |
| 4,532,437 | 7/1985 | Bodig et al. | 324/173 X |
| 4,580,047 | 1/1986 | Sasaki et al. | 324/173 X |
| 4,609,869 | 9/1986 | Metcalf | 324/208 |
| 4,670,852 | 6/1987 | Masaki et al. | 324/166 X |
| 4,715,009 | 12/1987 | Bohmler et al. | 324/178 X |

FOREIGN PATENT DOCUMENTS

| 47-41767 | 12/1972 | Japan . |
| 48-8582 | 2/1973 | Japan . |
| 52-13371 | 2/1977 | Japan . |
| 57-110551 | 7/1982 | Japan . |
| 60-25836 | 2/1985 | Japan . |
| 61-254863 | 11/1986 | Japan . |

Primary Examiner—Reinhard J. Eisenzopf
Assistant Examiner—Warren S. Edmonds
Attorney, Agent, or Firm—Oliff & Berridge

[57] ABSTRACT

A cycle time of pulses converted from an electrical signal generated at a rotational sensor is counted. In determining a cycle of the pulses, either a rising edge or a falling edge of the pulse is selected. As the selection of the either edge affects accuracy of the rotational speed measurement, two modes are proposed. One is suitable for a lower speed range in which either of the rising and falling edges is selected for every pulse monitoring period considering the relative phase position of the pulse and the pulse monitoring period. The other is suitable for a higher speed range in which one fixed edge is utilized. Here the edge is selected depending on the winding direction of the electric wire of the pick-up coil of the rotational sensor and independent of the pulse monitoring period.

6 Claims, 7 Drawing Sheets

FIG. 7A EXPANDED ROTOR

FIG. 7B CORE OF COIL | A | B | C | D | E |   TOOTH SPACE

FIG. 7C COIL OUTPUT

FIG. 7D BASE WAVE

FIG. 7E AMPLITUDE WAVE

ECCENTRIC ROTOR    NORMAL ROTOR

FIG. 7F COMPARISON OF COIL OUTPUTS

NORMAL EDGE

FIG. 7G RESULTANT PULSES $\Delta T_{E1}$ $\Delta T_{E2}$ $\Delta T_{E1}$   $\Delta T_{E1}$ $\Delta T_{E2}$ $\Delta T_{E1}$

ROTATIONAL SPEED SENSOR WITH UNFIXED AND/OR FIXED EDGE SPEED CALCULATION MODES

BACKGROUND OF THE INVENTION

This invention relates to a speed sensor for a rotating body in which a pick-up coil senses the passing of one of a plurality of teeth of magnetic material attached around the rotating body and the speed is measured from pulses converted from the output signal from the pick-up coil.

An electro-magnetic pick-up coil is generally superior to an optical sensor in its durability and maintainability. That is why a pick-up coil is frequently adopted in rotational speed sensors for use in various controllers requiring rotational speed as one of its control parameters. An anti-skid controller for a vehicle is disclosed, for example, in Published Unexamined Japanese Patent Application No. 60-25836, corresponding to U.S. Pat. No. 4,670,852, in which a speed sensor utilizing a pick-up coil is included. Here the rotational speed is measured from the cycle time of pulses and the cycle time is counted based on an arbitrarily predetermined one of the rising edge or falling edge of the pulses.

It is known that the output signal of the pick-up coil is ideal when the teeth and the spaces between the teeth are regularly arranged around the rotating body (preferably the ratio of [width of a tooth]:[width of a space] is 1:2) and the core diameter of the pick-up coil is set equal to the width of a tooth.

Further a method is already known (for example, in the document described above) to obtain accurate rotational speed by compensating for any loss of an output pulse due to a loss of a tooth and by eliminating sporadic error signals such as externally generated noise pulses.

In some cases, accuracy of the speed measurement is still deteriorated by other factors as set forth below.

One factor is the miniaturization of the rotor having the teeth and spaces. As described above, the tooth width, the space width and the core diameter should have a predetermined ratio in order to obtain an ideal output signal. Under such condition, when the size of the pick-up coil is determined, reduction in size of the rotor results in reduction in the number of teeth and spaces around the rotor. This leads to a longer interval between pulses (which is generated by a comparator from the output signal of the pick-up coil) at the same rotational speed. For example, the number of teeth around the rotor is halved when the rotor diameter is halved and the cycle time of the pulses is doubled at the same speed. Therefore, at a low speed, it may occur that the aforementioned predetermined edge (rising edge or falling edge) is not detected during a preset pulse monitoring period. In this case, speed measurement is impossible. Even when the predetermined edge (say, falling edge) is detected in the pulse monitoring period, it may sometimes occur that the pulse monitoring period and a speed calculation period for measuring the pulse cycle are out of phase. This leads to a slower response of the speed calculation to the actual speed change. In summary, the miniaturization of the rotor may lead to miscalculation or delayed calculation of the rotational speed.

Figure 7A:
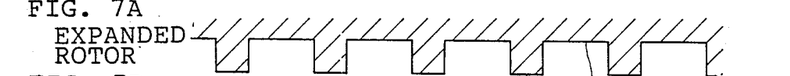
FIGS. 7A through 7G are graphs showing the cause of the shift of the pulse edges due to the eccentricity of the rotor.
Figures 7B, 7C:
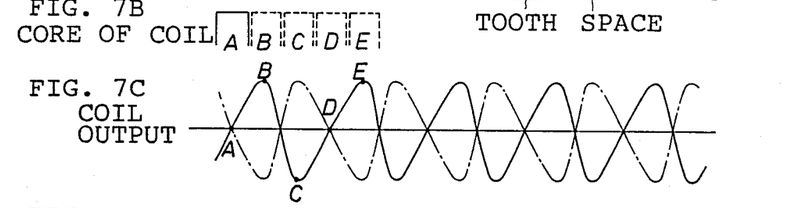

Another factor is the eccentricity of the rotor (an array of teeth) with respect to the center of the rotating body. This factor influences the accuracy of speed measurement independent of the size of the rotor. The mechanism is explained with reference to FIGS. 7A–7G. When the teeth and spaces of the rotor (FIG. 7A) pass the core of the pick-up coil (FIG. 7B), an electrical signal output from the pick-up coil is shaped as shown in FIG. 7C. As shown in FIG. 7C, the peak of the output signal is obtained when a tooth leaves the core (at B and E) and when a tooth passes the core (at C). When the center of the core coincides with the center of a tooth (at A and D) or a space, on the other hand, the output signal is zero. As the width of a tooth and the width of a space are not the same, the length of the region in which the output signal increases (such as from C to E) is not the same as the length of the region in which the output signal decreases (such as from B to C). Namely, the gradient of the output signal is different between those regions. Whether the increasing side slope is steeper or the decreasing side slope is steeper depends on the winding direction of the wire of the pick-u coil. The solid line and the broken line of FIG. 7C show the two cases where the winding directions are opposite.

Figure 7D:
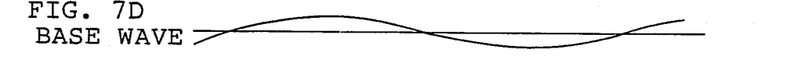
Figure 7E:
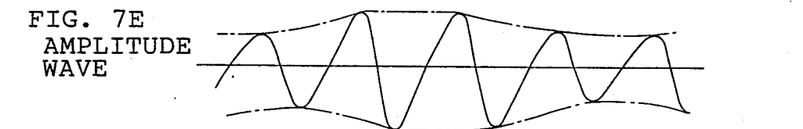
Figure 7F:
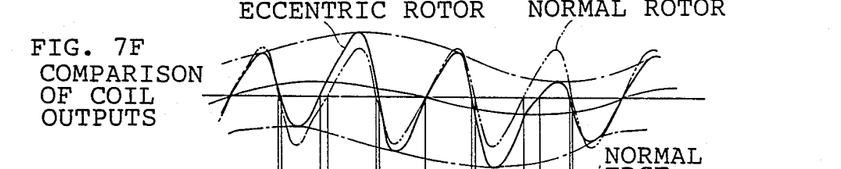
Figure 7G:
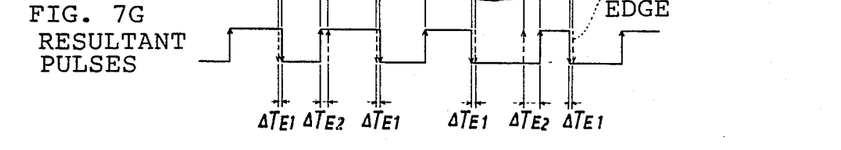

When an eccentricity of the rotor exists, the base of the output signal makes a low frequency wave whose cycle time is the same as the cycle time of the rotation of the rotor, as shown in FIG. 7D. Further, the eccentricity makes an amplitude wave superposed on the output signal because the distance between the teeth and pick-up coil varies during one rotational cycle of the rotor. The resultant shape of the output signal from the pick-up coil when an eccentricity exists is shown by a solid line in FIG. 7F. The two-dot broken line in FIG. 7F shows the normal output signal without the eccentricity. When the output signals are converted into pulses by a comparator, as shown in FIG. 7G, the positions of the rising edge and the falling edge of the pulses are influenced by the eccentricity. In other words, the position of the rising edge (which corresponds to the less steeper side slope of the output signal) is shifted out of normal position more than is the falling edge. As shown in FIG. 7G, the deviation of the rising edge ($\Delta TE2$) from the normal position is generally greater than that of the falling edge ($\Delta TE1$). Thus, when the rising edge is selected for the measurement of the cycle time of the pulse signals, the accuracy of the rotational speed measurement deteriorates. The accuracy deteriorates more as the speed of the rotating body increases because more pulses having the deviation are counted during a preset monitoring period. In practice, it is very difficult to avoid the effects of eccentricity.

SUMMARY OF THE INVENTION

An object of the present invention is, therefore, to provide a rotational speed sensor utilizing a pick-up coil which can always give a speed calculation result with less time lag even in a miniaturized rotor.

Another object is to provide a rotational speed sensor which produces a rotational speed with less error even when the rotor is eccentrically installed on the rotating body.

Figure 1:
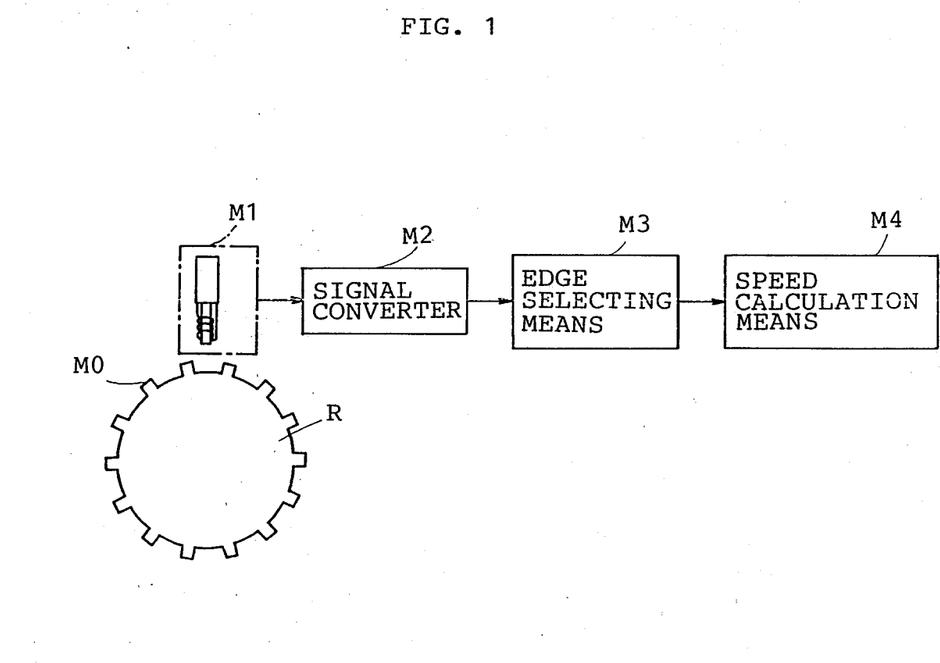
FIG. 1 is a schematic illustration of the structure of the present invention.

These and other objects are achieved by a rotational speed sensor of the present invention, as shown in FIG. 1, including a plurality of teeth M0 attached around a rotating body R, a pick-up coil M1 provided separately from the rotating body R, a signal converter M2, edge selecting means M3, and speed calculation means M4. The teeth M0 are made of magnetic material and the pick-up coil M1 generates an electrical signal responsive to the passing of any of the plurality of teeth M0. The electrical signal generated by the pick-up coil M1 is converted into pulses by the signal converter M2. The edge selecting means M3 selects either a rising edge or a falling edge of the pulses for every pulse monitoring period depending on a relative phase position of the pulses and the pulse monitoring period. Namely, the edge to be utilized in the speed calculation is not fixed.

For example, either one of the edges that occurs closest to the starting time of the pulse monitoring period may be selected by the edge selecting means M3. In this case, the pulse monitoring period and the speed calculation period come closest so that the responsiveness of the speed calculation is preferred. The edge selecting means M3 may instead select an edge that occurs just before (or just after) the pulse monitoring period starts. In this case, the selection processing is simplified so that the processing time is reduced.

The speed of the rotating body R is calculated by the speed calculation means M4 by measuring a cycle time of the selected edge of the pulses corresponding to the pulse monitoring period.

Another embodiment of the present invention has the same construction as the rotational speed sensor described above except that the function of the edge selecting means is different. In this embodiment, the edge selecting means selects either a rising edge or a falling edge of the pulses beforehand depending on the winding direction of the wire of the pick-up coil and independent of the pulse monitoring period. This one selected edge is fixedly utilized in the rotational speed calculation.

BRIEF EXPLANATION OF THE ATTACHED DRAWINGS

The invention may be best understood by referring to the following description of the preferred embodiment and the drawings in, which.

DETAILED DESCRIPTION OF THE PREFERRED EMBODIMENT

The invention is explained with reference to an embodiment of the rotational speed sensor applied to an anti-skid controller of a vehicle. The anti-skid controller controls the brakes of the four wheels independently to prevent excessive skid of the wheels.

Figure 2:
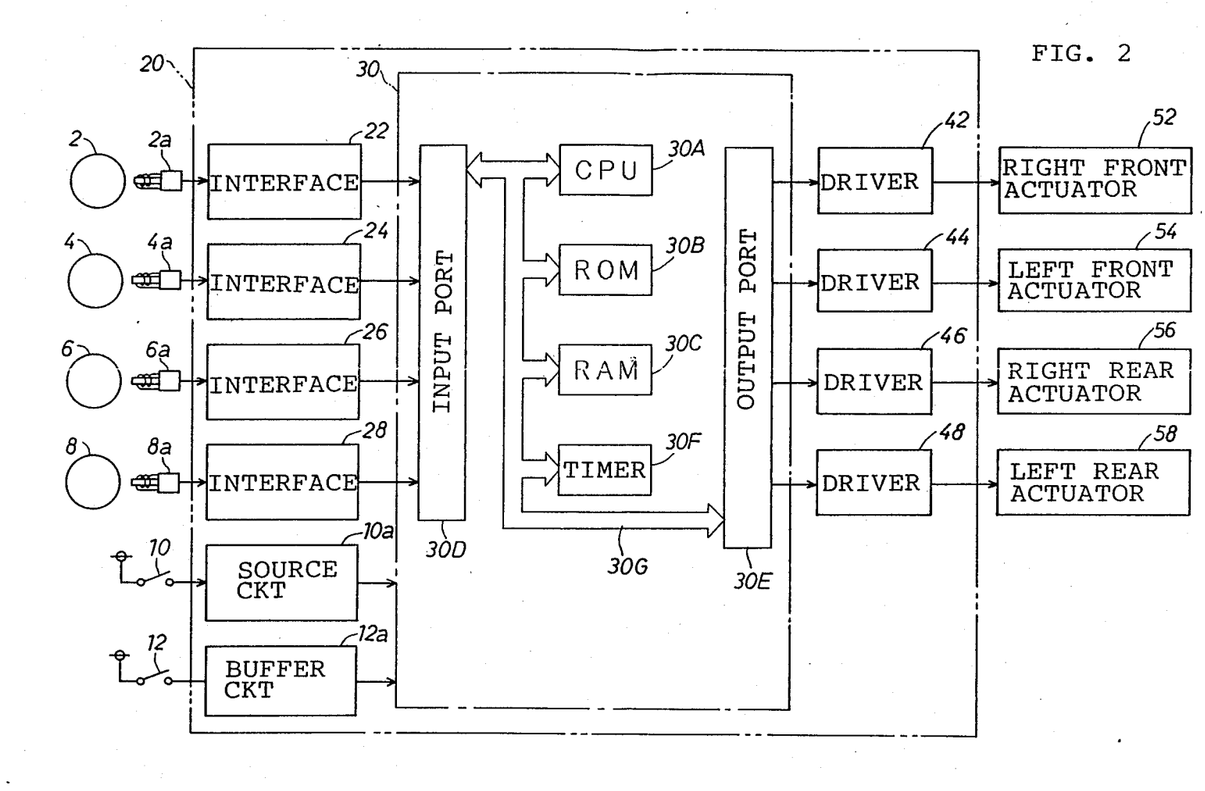
FIG. 2 is a structural diagram of an anti-skid controller as an embodiment of the invention.

As shown in FIG. 2, a right front, a left front, a right rear and a left rear rotors 2, 4, 6 and 8 are attached to the respective wheels to rotate with them. Each rotor has a plurality of teeth of magnetic material arranged around it, which are not shown in FIG. 2. Magnetic material as used herein encompasses not only magnets per se such as permanent magnets, but also any material which can effect a detectible change in an applied magnetic field. Sensors 2a, 4a, 6a and 8a, which are actually pick-up coils, are attached on the body side in the proximity of respective rotors 2, 4, 6 and 8 so that each of the pick-up coils faces the teeth of each rotor. The pick-up coils 2a, 4a, 6a and 8a sense any change in the magnetic field caused by the passing of any tooth of the rotors, and output an electrical signal corresponding to the change reflecting the rotation of the rotors 2, 4, 6 and 8.

An electronic control unit (ECU) 20, responsive to the electric signals from the sensors 2a, 4a, 6a and 8a, calculates the rotational speeds of the respective wheels Further, responsive to the signal from a stop switch 12 which detects whether the brake pedal is operated or not, the ECU 20 executes a predetermined anti-skid routine to control the braking force of respective wheels and outputs signals to a right front, a left front, a right rear and a left rear actuators 52, 54, 56 and 58 provided for the brake systems of respective wheels. The ECU 20 includes a micro computer 30 as its main portion and other peripheral circuits such as interfaces 22, 24, 26 and 28, the source circuit 10a, a buffer circuit 12a and drivers 42, 44, 46 and 48. The interface 22 converts the electrical signal from the right front sensor (pick-up coil) 2a into pulses suitable for data processing in the micro computer 30. Other interfaces 24, 26 and 28 correspond to the sensors 4a, 6a and 8a.

In this embodiment, the winding direction of the wire of the pick-up coils 2a, 4a, 6a and 8a is such that the rising edge of the pulses from an eccentric rotor yields a larger deviation from normal rising edge than does the falling edge.

The source circuit 10a is provided between an ignition switch 10 and the micro computer 30 to supply constant voltage to the micro computer 30 and other circuits. The buffer circuit 12a is provided between the stop switch 12 and the micro computer 30.

The micro computer 30 includes a CPU 30A, a ROM 30B, a RAM 30C, an input port 30D, an output port 30E, a timer 30F and a bus 30G for connecting them. The CPU 30A is for executing the speed calculation and the processing for the anti-skid control. The ROM 30B stores programs for the above calculation and processing, which will be explained later in detail, and other programs necessary in the anti-skid control such as programs for calculation of acceleration of the wheels, estimation of the body speed and so on. The RAM 30C temporarily stores data and transient results during the execution of the calculation and processing. The input port 30D and output port 30E are provided to handle the data between the micro computer 30 and the outer circuits. The timer 30F supplies a standard timing signal to the CPU 30A and other circuits.

The interfaces 22, 24, 26 and 28 are connected to the input port 30D, and driver circuits 42, 44, 46 and 48 are connected between the output port 30E and the respective actuators 52, 54, 56 and 58.

Speed determination processing for the speed sensors 2a, 4a, 6a and 8a is now explained. The rotational speed obtained by the following processing is utilized in the anti-skid control.

When the ignition switch 10 is turned on, a preset voltage is applied via the source circuit 10a to the micro computer 30. The micro computer 30 then starts execution of predetermined programs previously stored in the ROM 30B. The programs include one for wheel speed calculation and one for anti-skid control. The routine according to the wheel speed calculation program, which corresponds to the present invention, is heretofore explained with reference to flowcharts of FIGS. 3 and 4 and a timing chart of FIG. 5.

Figure 3:
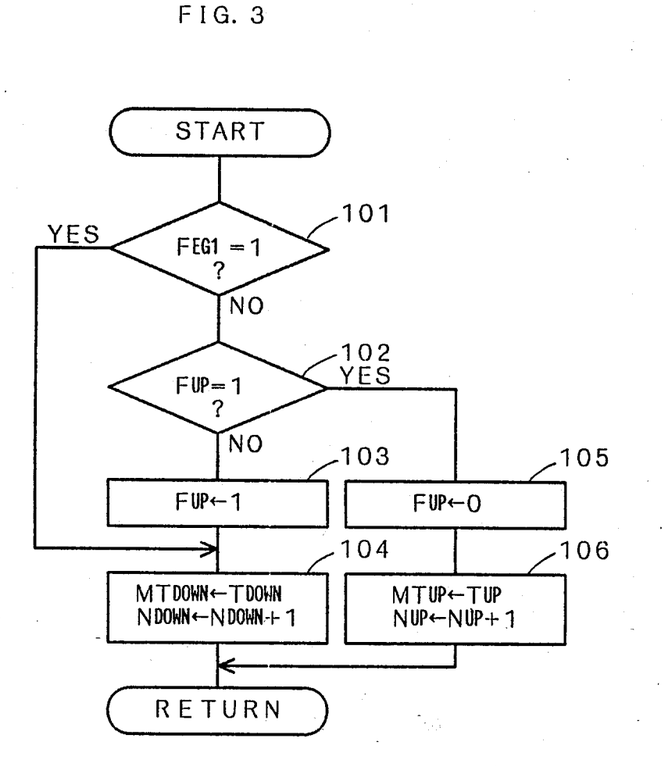
FIG. 3 is a flowchart of an interrupt processing routine.
Figure 4:
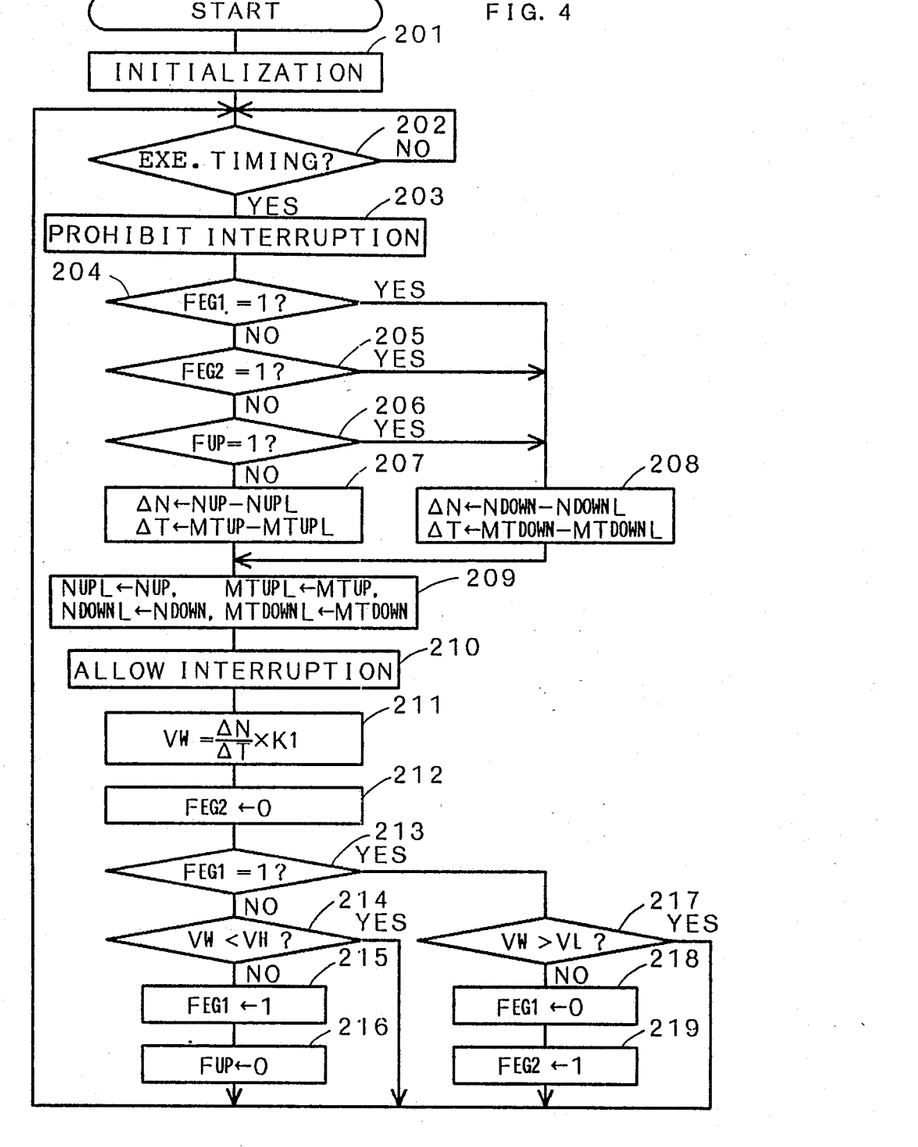
FIG. 4 is a flowchart of a speed calculation routine.

Routines of FIGS. 3 and 4 are executed for each of the four wheels. The flowchart of FIG. 3 shows a pulse interruption routine which is started at every occurrence of the rising edge and falling edge of pulses input from the interfaces 22, 24, 26 and 28 to the micro computer 30. Priority order among the pulse interruption routines of the four sensors is predetermined.

First in this routine, it is determined at step 101 whether a flag FEG1 is set at 1. The flag FEG1 is utilized in the speed calculation routine described later and, when set at 1, shows that an edge change is prohibited. When FEG1 =1, the program proceeds to step 104. If FEG1 is reset at 0, it is further determined at step 102 whether a flag FUP is set at 1. The flag FUP set at 1 shows that this routine is waiting for a rising edge. When it is determined that the flag FUP is reset at 0, the routine is waiting for a falling edge this time and the flag FUP is set at 1 at step 103 in order to wait for a rising edge next time. Then the time TDOWN of the occurrence of the falling edge is stored in a memory region MTDOWN of the RAM 30C and the count NDOWN of the falling edge is incremented by one (NDOWN←NDOWN+1) at step 104, and the routine ends.

If it is determined at step 102 that the flag FUP is set at 1, the routine is waiting for a rising edge this time and the flag FUP is reset at 0 at step 105 in order to wait for a falling edge next time. Then the time TUP of the occurrence of the rising edge is stored in a memory region MTUP of the RAM 30C and the count NUP of the rising edge is incremented by one (NUP←+NUP+1) at step 106, and the routine ends.

Namely, while the flag FEG1 is set at 1, only step 104 is executed in which only a falling edge is treated. This corresponds to the period between t5 to t7 of FIG. 5. This is hereinafter referred to as "fixed edge calculation" or "fixed edge processing". As mentioned above, the falling edge from an eccentric rotor yields less deviation from a normal falling edge in this embodiment. When, on the other hand, the flag FEG1 is reset at 0, both the rising edge and the falling edge are treated alternately at steps 104 and 106. This corresponds to the periods between t0 to t4 and t8 and after. This is hereinafter referred to as "unfixed edge calculation" or "unfixed edge processing".

Flowchart of FIG. 4 shows a routine for a speed calculation which is started when the ignition switch 10 is turned on. First, a predetermined initialization processing is executed at step 201. This step is executed only once at the start. The initialization includes various initializing processings for the CPU 30A (e.g., flag resettings) and a pulse initializing processing which is specific to this routine. The pulse initializing processing is to designate the falling edge, in this embodiment, in the unfixed edge processing. After this pulse initializing processing, the execution of the pulse interruption routine (FIG. 3) is started and the falling edge is treated first.

After the initialization, it is determined at step 202 whether it is time to execute this routine. The execution timing of this routine corresponds to the start of the pulse monitoring period described above. If it is determined that it is not time to calculate, the program waits here until the time arrives. When the time arrives, the program proceeds to step 203 where the processing of the pulse interruption routine is prohibited in order to prevent updating of data obtained at step 104 or 106 during processing of this routine. Then it is determined at step 204 whether the flag FEG1 is set at 1. As described before, the pulse interruption routine executes the fixed edge processing when FEG=1. Consequently, when FEG1=1, the fixed edge calculation is executed only at step 208. When, on the contrary, FEG1=0, the unfixed edge calculation is executed at steps 205 through 208, which corresponds to the unfixed edge processing in the pulse interruption routine.

The unfixed edge calculation is explained below. When it is determined at step 204 that FEG1 is reset at 0, it is then determined at step 205 whether a flag FEG2 is set at 1. The flag FEG2 set at 1 shows that this routine is first executed after the calculation mode is switched from the fixed edge calculation to the unfixed edge calculation. If FEG2=1, the program proceeds to step 208 in order to execute the fixed edge calculation. Namely, the fixed edge calculation is continued only for the first time after the calculation mode is switched from the fixed edge calculation to the unfixed edge calculation. This is because it is not necessarily the fixed edge (falling edge this time) that occurred just before this routine is executed. If the rising edge has occurred just before this routine started, the rising edge is not treated by the pulse interruption routine, therefore normal unfixed edge calculation is impossible for the first cycle after the calculation mode has switched from the fixed edge calculation to the unfixed edge calculation.

If it is determined that FEG2=0 at step 205, it is further determined at step 206 whether the flag FUP is set at 1. If FUP=1, the falling edge is treated in the pulse interruption routine executed just before this routine is executed. Therefore, the program proceeds to step 208 where falling edge calculations are executed. If FUP=0, the rising edge is treated in the pulse interruption routine executed just before this routine is executed. Therefore, the program proceeds to step 207 where rising edge calculations are executed.

Processing at step 207 is now explained in detail. A difference $\Delta N$ between the newest pulse count NUP (which is obtained at step 106 of the pulse interruption routine executed just before this routine is executed) and previous pulse count NUPL (which is stored in the RAM 30C in the previous execution of this routine) is calculated as follows:

$$\Delta N = NUP - NUPL.$$

Then a difference $\Delta T$ between the arrival time MTUP of the newest rising edge (which is obtained at step 106 of the pulse interruption routine executed just before this routine is executed) and the occurrence time MTUPL of previous rising edge (which is stored in the RAM 30C in the previous execution of this routine) is calculated as follows:

$$\Delta T = MTUP - MTUPL.$$

If the determination result is YES at steps 204, 205 or 206, falling edge calculations are executed at step 208, which is similar to the step 207. Namely, calculations $$\Delta N = NDOWN - NDOWNL$$

and $$\Delta T = MTDOWN - MTDOWNL$$

are executed.

After the calculations at steps 207 and 208, the newest data NUP, MTUP, NDOWN and MTDOWN are stored as temporary variables NUPL, MTUPL, NDOWNL and MTDOWNL at step 209 for use in the next time execution of this routine. Specifically, If the edge treated just before execution of this routine is a rising edge, the count NUP of the rising edge is stored as NUPL and the occurrence time MTUP of the rising edge is stored as MTUPL. The count NDOWN of the falling edge that was treated just before the rising edge is stored as NDOWNL and the occurrence time of the falling edge MTDOWN is stored as MTDOWNL. If the edge treated just before execution of this routine is a falling edge, the data are similarly stored as the variables.

Then the interruption is allowed at step 210 to enable execution of the pulse interruption routine. At step 211, the rotational speed VW of the wheel is calculated by the following equation:

$$VW = (\Delta N / \Delta T) \cdot K1,$$

where K1 is a constant.

Then the flag FEG2 is reset at 0 at step 212 and it is determined again at step 213 whether the flag FEG1 is set at 1. If the flag FEG1 is not set (FEG1=0), it is determined at step 214 whether the speed VW calculated at step 211 is less than a predetermined high reference speed VH. If the flag FEG1 is set at 1, it is determined at step 217 whether the calculated speed VW is greater than a predetermined low reference speed VL.

When the calculated speed VW is determined to be less than VH at step 214 under the condition FEG1=0 (this condition starts when VW≦VL, as shown by steps 217 and 218), the program jumps to step 202 to wait for the next execution of this routine. Namely, when the speed VW is lower than VH, the unfixed edge calculations are continued because FEG1=0 which means the edge change is allowed.

Figure 5:
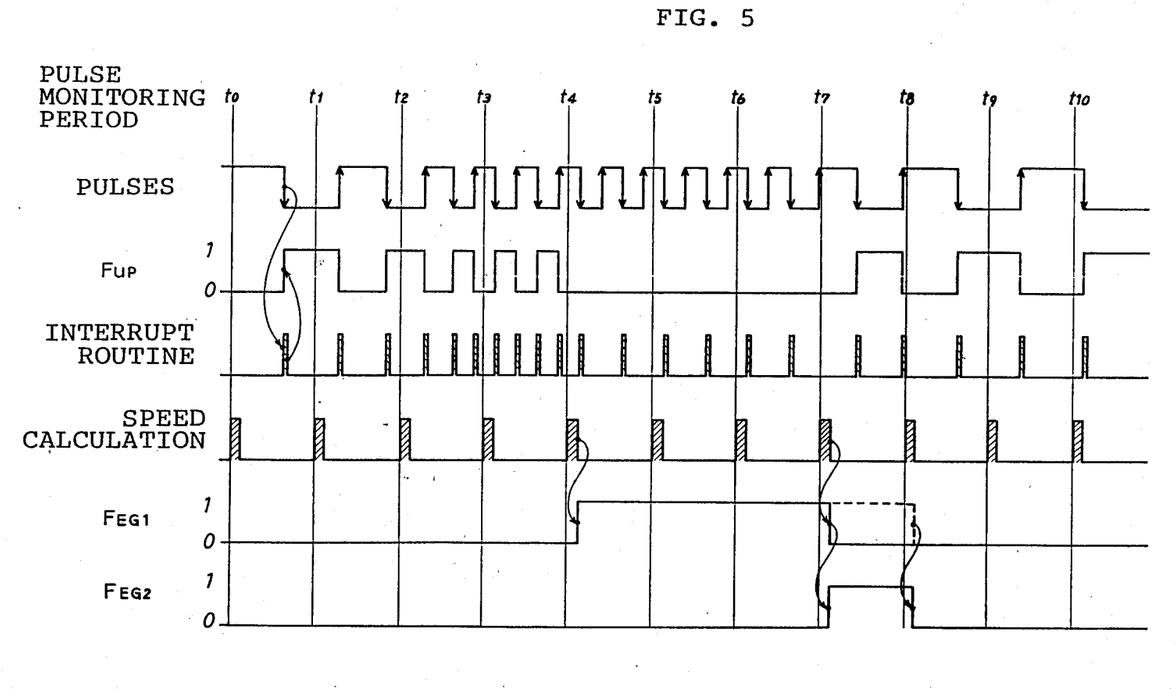
FIG. 5 is a timing chart illustrating the processing of the embodiment.

The unfixed edge calculations are performed in the periods between t0 to t4 and t9 and after in FIG. 5. In these periods, both edges are treated in the interruption routine. If the flag FUP is reset at 0 at the start of the speed calculation routine (as at t3, t4 and t10), the speed calculation is performed with respect to two rising edges that have occurred in the previous two pulse monitoring periods. If, on the other hand, FUP=1 at the start of the speed calculation routine (as at t1, t2 and t9), the speed calculation is performed with respect to two falling edges.

When it is determined that VW≧VH at step 214, the flag FEG1 is set at 1 at step 215, the flag FUP is reset at 0 at step 216 and the program jumps to step 202 to wait for the next execution of this routine. This is the case where the speed VW increases to exceed VH. In this case, the edge change is prohibited by setting the flag FEG1, i.e., the calculation mode is changed from the unfixed edge calculation to the fixed edge calculation (t4 of FIG. 5).

When the calculated speed VW is determined to be greater than VL at step 217 under the condition FEG1 = 1 (this condition starts when VW≧VH, as shown by steps 214 and 215), the program jumps to step 202 to wait for the next execution of this routine. Namely, while the speed VW is higher than VL, the fixed edge calculations are continued because FEG1=1 which means the edge change is prohibited. This corresponds to the period between t5 to t7 of FIG. 5, in which FUP=0 and only falling edges are treated in the pulse interruption routine.

When it is determined that VW≦VL at step 217, the flag FEG1 is reset at 0 at step 218, the flag FEG2 is set at 1 at step 219 and the program jumps to step 202 to wait for the next execution of this routine (t7 of FIG. 5). This is the case where the speed VW decreases to a value less than VL. In this case, the edge change is allowed by resetting the flag FEG1 at 0, i.e., the calculation mode is switched from the fixed edge calculation to the unfixed edge calculation. The setting of the flag FEG2 at step 219 is to indicate the switch of calculation mode from the fixed edge calculation to the unfixed edge calculation, which is utilized in step 205 as described before. Consequently, the next speed calculation (at t8 of FIG. 5) is performed with the fixed edge calculation, though the calculation mode has changed to the unfixed calculation. For the second cycle and after (t9 and after), normal unfixed calculations are performed.

The ECU 20 executes processings for anti-skid control based on the respective wheel speeds VW calculated as above.

Figure 6:
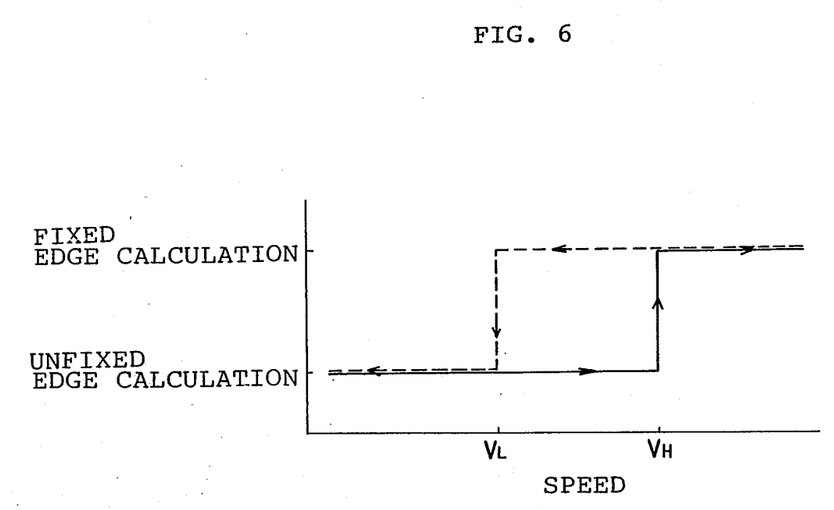
FIG. 6 is a graph showing the change of the speed calculation modes in the embodiment.

In summary, when the speed VW is less than the low reference speed VL, the speed is calculated by the unfixed edge calculation. When the speed VW is greater than the high reference speed VH, the speed is calculated by the fixed edge calculation. When the speed enters into the region between the two reference speeds VL and VH, the former calculating mode is continued, i.e., the calculating method is designed to behave with hysteresis, as shown in FIG. 6. This hysteresis prevents unnecessarily frequent switches between the calculation modes when the speed wanders about the reference speeds VL and VH.

In the unfixed edge calculation, any edge that comes just before the pulse monitoring period starts is adopted for every monitoring period to define the start and the end of the speed calculation period. This increases the chances for pulse counting even if the cycle time of the pulses is doubled, and higher responsiveness of the speed calculation is realized for every pulse monitoring period. Namely, the size of the rotor can be reduced without sacrificing accuracy in speed calculation at low speed.

In the fixed edge calculation, on the other hand, a fixed edge (a falling edge in the above embodiment) is exclusively utilized for measuring the cycle time of the pulses. The fixed edge is determined based on the winding direction of the wire of the pick-up coil 2a, 4a, 6a and 8a. Specifically, when the rotor is eccentrically installed on the rotating body, either one of the rising edge and the falling edge is selected depending on which produces less deviation from normal edge timing. This leads to more accurate speed calculation at high speed In the above embodiment, the speed calculation system adopted both the fixed edge calculation and unfixed edge calculation. It is naturally understood that adopting either one of the calculation modes is enough to improve accuracy in speed calculation.

Obviously, many modifications and variations of the present invention are possible in light of above teachings. It is therefore understood that within the scope of the appended claims, the invention may be practiced otherwise than as specifically described. For example, though speed calculation is exemplified in the anti-skid control in the above embodiment, the speed sensor can be utilized in any other controller that requires accurate sensing of rotational speed, e.g., a shock absorber controller for a vehicle.

What is claimed is:

1. A speed sensor for a rotating body comprising:
   a plurality of teeth attached around the rotating body, the teeth being made of magnetic material;
   a magnetic pick-up element provided separately from the rotating body for generating an electrical signal responsive to passing of any of the plurality of teeth;
   a signal converter for converting the electrical signal into pulses;
   edge selecting means for selecting either a rising edge or a falling edge of the pulses for every pulse monitoring period depending on a relative phase position of the pulses and the pulse monitoring period; and
   speed calculation means for calculating the speed of the rotating body by measuring a cycle time of the selected edge of the pulses corresponding to the pulse monitoring period,
   wherein any one of the rising edge and the falling edge that occurs just before the pulse monitoring period starts is selected by the edge selecting means.

2. A speed sensor for a rotating body comprising:
   a plurality of teeth attached around the rotating body, the teeth being made of magnetic material;
   a pick-up coil provided separately from the rotating body for generating an electrical signal responsive to a passing of any of the plurality of teeth;
   a signal converter for converting the electrical signal into pulses;
   edge selecting means for selecting either a rising edge or a falling edge of the pulses in a first mode when the speed of the rotating body is lower than a low reference speed and in a second mode when the speed of the rotating body is higher than a high reference speed, the first mode being to select either the rising edge or the falling edge for every pulse monitoring period depending on a relative phase position of the pulses and the pulse monitoring period, and the second mode being to select the one of the rising edge and the falling edge that corresponds to a steeper side slope of the electrical signal generated at the pick-up coil; and
   speed calculation means for calculating the speed of the rotating body by measuring a cycle time of the selected edge of the pulses corresponding to the pulse monitoring period.

3. The rotational speed sensor according to claim 2, wherein the one of the rising edge and the falling edge that occurs just before the pulse monitoring period starts is selected in the first mode.

4. The rotational speed sensor according to claim 3, wherein the same mode is adopted by the edge selecting means in a range between the low reference speed and the high reference speed as the mode adopted before the speed of the rotating body enters the range.

5. The rotational speed sensor according to claim 4, wherein the edge is selected in the second mode for the first cycle of the pulse monitoring period after the edge selecting mode is switched from the second mode to the first mode, and is selected in the first mode from the second cycle and after.

6. A speed sensor for a rotating body comprising:
   a plurality of teeth attached around the rotating body, the teeth being made of magnetic material;
   a magnetic pick-up element provided separately from the rotating body for generating an electrical signal responsive to a passing of any of the plurality of teeth;
   a signal converter for converting the electrical signal into pulses;
   edge determining means for determining a rising edge and a falling edge of the pulses for every pulse monitoring period;
   rising edge speed calculation means for calculating the speed of the rotating body based on a time interval and the number of rising edges between the rising edge of a present pulse monitoring period and the rising edge of the previous pulse monitoring period;
   falling edge speed calculation means for calculating the speed of the rotating body base don a time interval and the number of falling edges between the falling edge of a present pulse monitoring period and the falling edge of the previous pulse monitoring period; and
   selecting means for selecting the one of said rising and falling edge speed calculation means which corresponds to the edge occuring just before the pulse monitoring period, to provide a speed corresponding to said pulse monitoring period.

* * * * *